United States Patent
Reime

(10) Patent No.: US 7,259,367 B2
(45) Date of Patent: Aug. 21, 2007

(54) RAIN SENSOR DEVICE FOR DETECTING THE WETTING AND/OR SOILING OF A WINDSCREEN SURFACE

(75) Inventor: Gerd Reime, Buehl (DE)

(73) Assignee: Elmos Semiconductor AG, Dortmund (DE)

( * ) Notice: Subject to any disclaimer, the term of this patent is extended or adjusted under 35 U.S.C. 154(b) by 114 days.

(21) Appl. No.: 10/514,710

(22) PCT Filed: May 19, 2003

(86) PCT No.: PCT/EP03/05221

§ 371 (c)(1),
(2), (4) Date: Jul. 18, 2005

(87) PCT Pub. No.: WO03/097420

PCT Pub. Date: Nov. 27, 2003

(65) Prior Publication Data

US 2006/0163458 A1    Jul. 27, 2006

(30) Foreign Application Priority Data

May 18, 2002    (DE) ................................ 102 22 321

(51) Int. Cl.
*G02B 6/42* (2006.01)
(52) U.S. Cl. .................................. 250/227.25; 250/221
(58) Field of Classification Search .......... 250/227.25, 250/221, 216, 559.4, 239, 227.24
See application file for complete search history.

(56) References Cited

U.S. PATENT DOCUMENTS 6,672,745 B1 *    1/2004    Bauer et al. ................. 362/545

FOREIGN PATENT DOCUMENTS

| DE | 19704818 A | 8/1997 |
|----|------------|--------|
| DE | 19950060 A | 5/2001 |
| WO | WO 0053466 A | 9/2000 |
| WO | WO 02083468 A | 10/2002 |

OTHER PUBLICATIONS

International Preliminary Examination Report from PCT, Application No. PCT/EP2003/005221, Mailed: Feb. 17, 2005.

* cited by examiner

*Primary Examiner*—Que T. Le
(74) *Attorney, Agent, or Firm*—Shumaker & Sieffert

(57) ABSTRACT

A device for detecting the wetting and/or soiling of a windscreen surface, in particular in a vehicle, comprises a camera with a sensor having a plurality of light-sensitive pixels arranged as an array and adapted to be illuminated according to an illumination cycle, and having a focussing optic for a camera focus set to almost infinite. The device is further provided with a light source for illuminating a detection portion of the screen surface detectable by the camera. The light source may be switched on and off according to a predeterminable ON/OFF cycle. The ON/OFF cycle is synchronized to the illumination cycle of the camera sensor, and the wetting/soiling of the screen surface may be detected by comparing the image information from the sensor of the camera when the light source is turned on and when the light source is turned off.

23 Claims, 8 Drawing Sheets

RAIN SENSOR DEVICE FOR DETECTING THE WETTING AND/OR SOILING OF A WINDSCREEN SURFACE

TECHNICAL FIELD

The invention relates to an optical sensor for detecting soiling/humidity on a pane, in particular a windscreen of a motor vehicle.

BACKGROUND

For controlling the windscreen wipers in dependence on the wetting condition of a motor vehicle, windscreen sensors of various configurations are known.

In some cases detection of the wetting condition requires that the sensor gets in direct contact with the humidity, e.g. in the case of resistive or thermal sensors. Sensors which do not get in direct contact with humidity are in most cases mounted directly at the inner windscreen surface and utilize the change in the refraction index at the wetted windscreen surface (FIG. 1).

A light beam 6, in particular in the infrared range, is coupled by a sensor element 4 at a certain angle into the vehicle windscreen 1 such that the light beam 6 is reflected as completely as possible at the surface and can be received by a photo diode 4. When the surface is wetted by water drops, the refraction conditions at the surface are disturbed such that the light portion measured at the photo diode 4 varies as a function of the wetting condition.

The variation of the amplitude of the received light is evaluated for the purpose of controlling the windscreen wipers.

Such as system which offers the advantage of complete insensitivity towards foreign light is known from WO-A-95/01561.

In contrast to resistive, thermal or capacitive systems, optical rain sensors of the type described above were successful in the market. A certain restriction with regard to the mounting location is the necessity of direct optical contact with the windscreen inner surface and/or special measures to be taken for coupling the light beam in and out.

The employment of a video camera for detecting a wetting or soiling condition on the windscreen outer surface is known from DE-C-198 03 644, DE-A-197 49 331, DE-A-197 04 818, U.S. Pat. No. 6,097,024 and U.S. Pat. No. 4,867,561. However, these cameras of these systems exclusively serve for detecting rain drops.

SUMMARY OF THE INVENTION

It is an object of the invention to allow detection of the wetting condition of a pane surface from a distance with the aid of a camera whose focus lies, as seen from the camera, far behind the pane surface. In particular, the invention is intended to allow employment of a camera for detecting fogging/condensation and/or rain on a windscreen, said camera being provided for covering the area in front of the vehicle as seen in the driving direction.

According to the invention, for achieving this object a device for detecting the wetting and/or soiling of a windscreen surface (on the inside and the outside), in particular of a vehicle, is proposed wherein the device comprises:

a camera comprising a sensor having a plurality of light-sensitive pixels arranged in the form of an array and being adapted to be illuminated in accordance with an illumination cycle, and a focussing optics for a focus of the camera set to almost infinite, and a light source for illuminating a coverage range of the windscreen surface adapted to be covered by the camera, wherein the light source is adapted to be switched on and off in a predeterminable ON/OFF cycle, the ON/OFF cycle is synchronized with the illumination cycle of the sensor of the camera, and wetting/soiling of the windscreen surface is detectable by comparing the image information from the sensor of the camera with the light source being switched on and of.

Various embodiments of the invention are stated in the subclaims.

According to the invention, a video camera is used for detecting fogging and/or wetting of a windscreen of a vehicle.

Video cameras in vehicles are generally known and are used, for example, for covering an area in front of the vehicle. Thus, the vehicles can be automatically controlled. The invention provides for a video camera, in case such a video camera is mounted in a motor vehicle, to be additionally used for detecting fogging and/or wetting and soiling of the windscreen. Such a camera covers an area of e.g. 10 m to 50 m in front of the vehicle. In other words, its focus is adjusted to quasi-infinity. The camera "looks" through a relatively small area of the windscreen wiped by the windscreen wipers at the road as well as the area at both sides of and above the road. Without any additional measures taken, a rain drop is recognized by the camera only in an unsharp manner at this focal adjustment (quasi-infinite), which is of advantage in that otherwise the image information important for the (semiautomatic) vehicle control would be falsified or not detected.

According to the invention, wetting/soiling of the windscreen is made visible to the camera by clocked illumination by means of light, wherein the light source clock for this exposure purpose is synchronized with the exposure frequency of the camera. Exposure of the camera is effected, in dependence on the type, either pixel-, line- or image-wise. If the light source is e.g. switched on at half the exposure frequency, every second pixel, every second line and/or every second image comprises, besides the image information (brightness value) additional brightness information when in the coverage range of the pixel, the line and/or the image concerned wetting of the windscreen is detected. By comparing the brightness values of adjacent pixels, lines or images of successive images or, more generally, by comparing the brightness values of pixels, lines and/or images including pure image information, with pixels, lines and/or images comprising, due to additional illumination by the light source, also wetting information (additional brightness values), it can be detected whether a wetting condition exists or does not exist. It is assumed that the image information does not substantially change despite their detection by the camera pixels succeeding each other in terms of time. This assumption applies when the exposure frequency (image rating frequency) of the camera is comparably high. This is already the case e.g. as from 50 images per second.

In an preferred aspect of the invention, light in the non-visible wavelength range is used for the clocked additional exposure of the camera (always exposure to the ambient light). This measure is advantageous in that the passengers are not troubled by the clocked light, and the generally used digital cameras are generally sensitive in this wavelength range. Conventionally, the non-visible wavelength range is filtered out by such cameras since the cameras is to only "see", during their application e.g. for covering the road, what is also visible to the human eye. The same situation prevails when a digital camera is used e.g. as a photo camera.

Appropriately, the additional clocked light source is sinusoidally controlled. This is of advantage with regard to electromagnetic compatibility.

In a further preferred aspect of the invention it is provided to detect wetting of the windscreen surface by filtering out and evaluating the ON/OFF cycle frequency, by means of which the light source is adapted to be activated, with the aid of a synchronous demodulator and/or a filter assembly.

Preferably, an image brightness signal can be obtained form the output signal of the sensor of the camera, namely by filtering the ON/OFF cycle frequency out of this image brightness signal.

In the case of clocking of the light source in accordance with the pixel interrogation frequency of the sensor of the camera, it is of advantage when the ON/OFF cycle of the light source is phase-shifted from line to line by 180°. Within the two-dimensional pixel field of the camera every second pixel would be exposed to the light of the additional light source, wherein the additionally exposed pixels are arranged from line to line with a gap between them.

In the case of a light source clocked in accordance with the line interrogation frequency and/or the image interrogation frequency, the aforementioned phase shift is generally not necessary.

Preferably, it is further provided that for obtaining a signal indicating a wetting condition from the signal of the sensor of the camera, the signals of the pixels of two successive lines of the sensor are subtracted. In this connection, it is further appropriate when the wetting signal is subjected to a filtering and/or synchronous demodulation process.

For obtaining an image signal with superimposed wetting information (d. c. light portion), preferably the signals of two successive lines of the sensor are added.

For obtaining an image signal without wetting information, the light source is clock-synchronously changed over between two lines of the sensor of the camera lying one behind the other.

Preferably, it is further provided that within a time segment of the output signal of the sensor of the camera an averaging without switched-on light source is effected, that for another time segment of the output signal of the sensor of the camera an averaging with switched-on light source is effected, and that for obtaining a wetting signal and/or a wetting value, the two average values are compared with each other. This procedure is applied in particular when the evaluation as to whether a wetting/fogging/soiling condition exists is carried out on the basis of a complete camera image. If the average value of a camera image, in the case of exposure exclusively to the ambient light, differs from the average value of a following camera image, in the case of additional exposure to the light source, by less than a predeterminable threshold value, no soiling and/or fogging/wetting condition exists. If the difference in the average values remains the same over a plurality of image sequences, a consistent wetting/bedewing condition exists. This indicates that the windscreen is soiled e.g. by an insect impinging upon the windscreen. Finally, if the difference in the average values varies over a plurality of image sequences, a variable soiling of the windscreen exists, which indicates rain or fogging.

In the procedure described above, a mutual comparison between the average value of the time segments without switched-on light source and the average value of the time segments with switched-on light source is performed by filtering the differential value and/or synchronous demodulation for the purpose of detecting a wetting condition.

With regard to coupling the additional light into the windscreen it is of advantage when this light is directly coupled into the windscreen, wherein, when a wetting condition exists, a reflection towards the camera is effected at the side opposite the coupling-in side. The coupling-in of the light is appropriately effected from the side into the windscreen or via a prism into the surface of the windscreen.

Preferably, the electromagnetic radiation of the light source impinges upon that surface of the windscreen and is reflected there, on which a wetting condition is detectable.

The concept according to the invention can be used for detecting of both outside wetting (rain) of the windscreen and internal fogging of the windscreen. To be able to differ between the two conditions, it is advantageous when a second light source is used whose light impinges by total reflection on the inside of the windscreen for the purpose of detecting any fogging. These two light sources are adapted to be separately activated for the purpose of separate detection of a wetting condition on the outside of the windscreen and a fogging condition on the inside of the windscreen. Alternatively, the two light sources can be simultaneously activated at different clock frequencies.

For detecting an outside wetting condition, the brightness value obtained by exposure to the second light source and reflection at the inside of the windscreen towards the camera (possible in the case of bedewing), is subtracted form the brightness value obtained by illuminating the windscreen with the first light source, which causes reflections at the inside and the outside of the windscreen, in order to obtain information on the outer wetting condition (rain).

Advantageously, it is further provided that the light from the first light source impinges by total reflection upon the inside of the windscreen for detecting an internal fogging condition, and the light from the second light source impinges by total reflection upon the outside of the windscreen for detecting an outside wetting condition.

Finally, it is noted that it may be of advantage when the focussing optics of the camera is set between almost infinite and the windscreen surface.

Alternatively, it is further possible to employ a detector for detecting contrast steps in the signal of the sensor for sensing a wetting/soiling condition on the windscreen surface.

BRIEF DESCRIPTION OF THE DRAWING

The invention and preferred embodiments thereof will now be described in greater detail with reference to the drawings in which.

DETAILED DESCRIPTION

Figure 1:
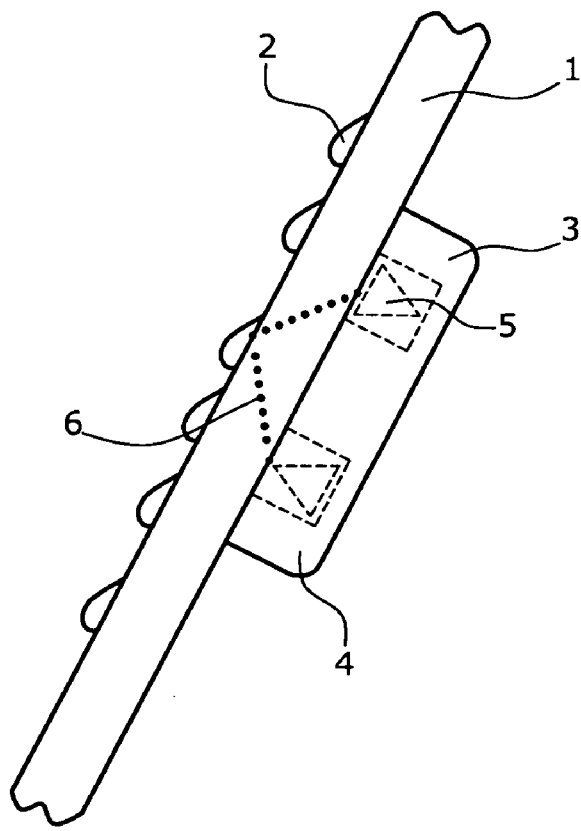
FIG. 1 shows a schematic representation of the setup of a conventional rain sensor and its arrangement relative to a windscreen.
Figure 2:
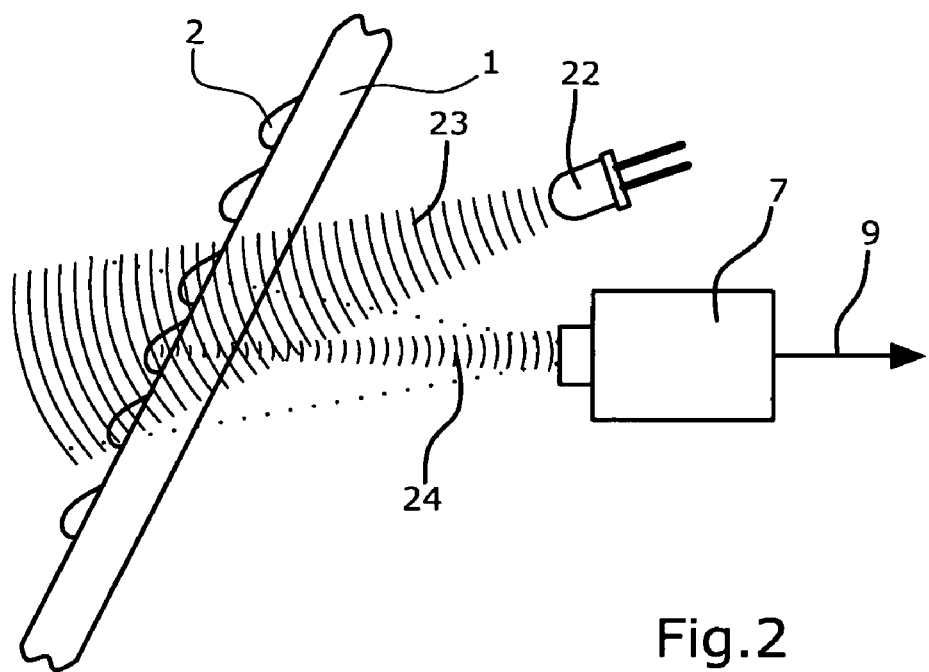
FIG. 2 shows a schematic representation of a rain sensor according to the invention for contactless detection of inside and outside wetting and soiling of a windscreen.

According to FIG. 2 a camera 7 (e.g. monochromatic CCD or CMOS camera) is arranged inside the vehicle such that it covers a portion of the windscreen 1 in the area swept by the windscreen wiper.

The actual function of the camera 7 is to monitor the road at a larger distance to the vehicle for the purpose of road, distance or tunnel detection. The camera 7 is normally arranged such that it looks from inside the vehicle through the windscreen 1 in forward direction, wherein the line of vision of the camera preferably is concordant with that of the driver.

By corresponding evaluation of the detected brightness signals of the image taken e.g. the position of the vehicle centrally to the median and the shoulder of a road can be calculated and/or regulated.

For this purpose it is necessary to place the focal point, i.e. the portion of the optimum image definition, outside the vehicle windscreen in order to take up the image elements important for calculation purposes, which are rich in contrast and show a high edge definition. This may e.g. be the area 10-50 m in front of the vehicle. This requires the camera 7 to be focused to almost infinite such that the windscreen surface and/or the wetting of the windscreen surface seem out of focus in the image. The function of the arrangement described here is to detect drops near the camera objective with simultaneous focusing of the image definition to almost infinite.

Changes occurring directly on the windscreen surface, e.g. by wetting, are however, represented in a less sharply defined manner. This offers the advantage that wetting of the surface does not affect, up to a certain extent, the representation at a distance of e.g. 30 m. This "unsharp" image of the rain drops is distributed to larger image regions such that the road continues to be represented nearly in a high-contrast manner.

In this case, on the basis of the image brightness signal supplied by the cameral small drops on the windscreen surface would be nearly invisible. A reduction of the aperture and thus an extended depth of field are not recommended since this would result in rain drops on the windscreen surface and objects at a very large distance being rendered with the same sharp definition.

"Disturbing information" produced by drops then superimpose the useful information concerning the road and may lead to an incorrect estimation during the computer-aided evaluation of the current driving situation.

If the image information of objects located at a large distance is not to be affected by wetting of the windscreen surface, if possible, it is advantageous to select a wide objective aperture when focusing the objective to almost infinite.

The depth of field is thus reduced, and when the camera is focused to almost infinite, image details of the immediate vicinity are no longer detected. Thus impinging rain drops have, up to a certain extent, hardly any influence on the image quality of objects located at a large distance.

Without taking any further measures, this arrangement hardly allows detection, in particular of small rain drops, from the camera-supplied image information with the aid of corresponding algorithms.

Figure 3:
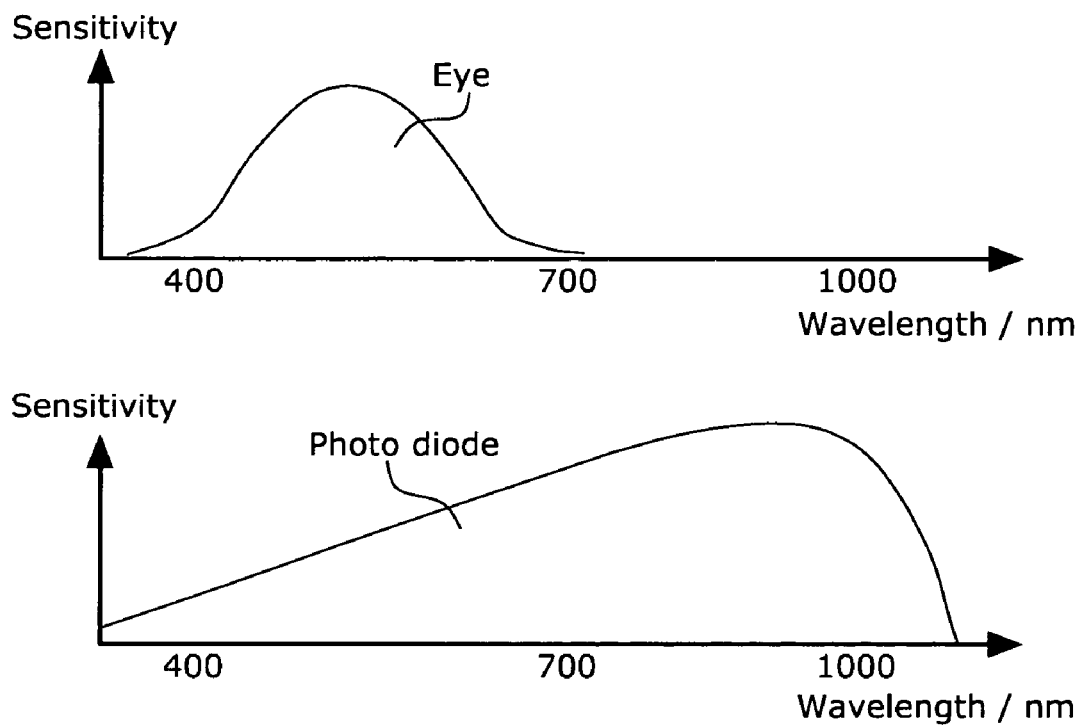
FIG. 3 shows a comparison of the sensitivities of the human eye with the wavelength of electromagnetic radiation.

To be able to properly detect even smallest drops despite the "unsharp" image information, the arrangement described here utilizes the effect that a video camera on silicon basis covers a much larger spectral range than the human eye. Thus, in contrast to the human eye, a camera is still sensitive in the near infrared range, i.e. at wavelengths of 700-1000 nm and/or even reaches its maximum sensitivity in this range. FIG. 3 shows the difference of the sensitivity range of the eye relative to the sensitivity range of silicon.

Generally, during camera operation the infrared range is suppressed by barrier filters. Infrared portions would otherwise occur in the video information and alienate the brightness representation, to which the eye is used, of known image information during representation on a monitor.

In the embodiment described here, an IR barrier filter is explicitly omitted. This does however not matter since the image information is not represented on a monitor.

For detecting rain drops 2 on the windscreen surface 1 infrared light 23 is radiated via e.g. an IR light source 22 at a certain clock ratio to the pixel-, line- or image rating frequency into the window portion utilized by the camera 7.

This may be effected e.g. by infrared LEDs with a wavelength of e.g. 880 nm, said LEDs radiating pulsed light approximately parallel to the line of vision of the camera into the windscreen. To obtain better efficiency, the windscreen should be not an IR barrier in this portion.

Figure 4:
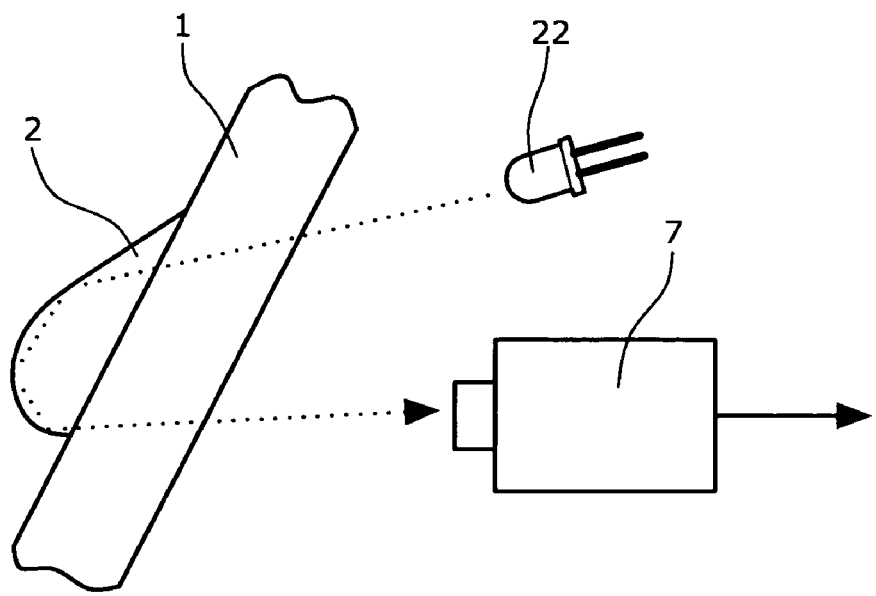
FIG. 4 shows a schematic representation for explaining the coupling-in of pulsed light into the camera when the windscreen is wetted.

The IR light 23 is at least partly reflected by the rain drops on the windscreen 1 back to the camera by multiple reflection (see light beam 24 in FIG. 2), as schematically shown in FIG. 4.

Preferably, the IR light is not only reflected by the drops directly on the windscreen, but also by drops in the air up to a certain distance to the windscreen surface.

Figure 5:
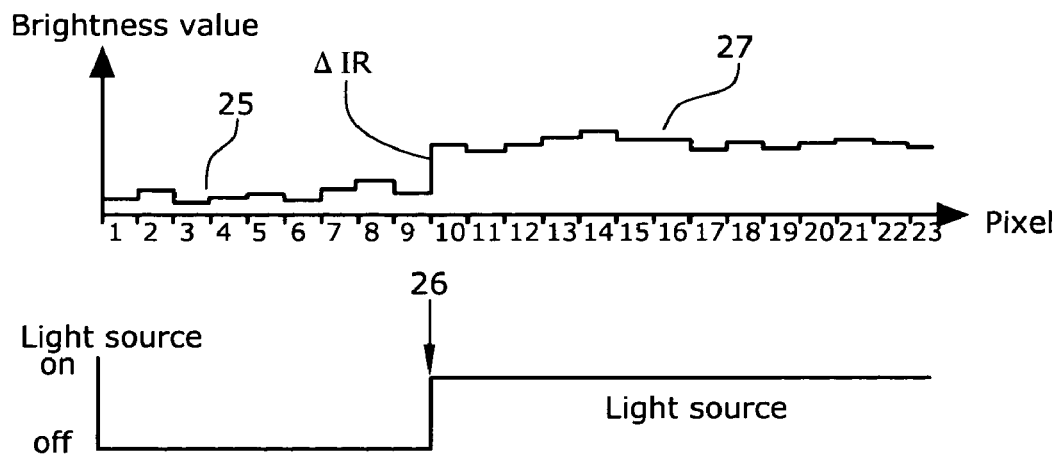
FIG. 5 shows a time diagram for the brightness values of exemplary successive pixels of the camera and the switching on/off of the light source.

FIG. 5 shows a line-sequential scanning of the camera image over a certain number of pixels, e.g. 1 to 10.

For better understanding, a uniformly illuminated area was taken as a background image (see signal pattern 25 in FIG. 5), said area corresponding to the electric value of the image brightness of the scanned area.

At the time 26 the IR light source was connected, which results in the signal pattern 27.

The additional value Δ IR now corresponds to the value of the IR radiation reflected by the drops on the windscreen. The value of the IR light quantity Δ IR reflected by the drops thus statistically represents the magnitude of the wetting of the windscreen surface.

Without wetting, this value ΔIR approaches 0 and considers only the constant value of a possible reflection at the windscreen itself an/or the soiling particles on the windscreen.

Since in the practice the camera of course supplies a constantly changing image and thus changing line information, this method does not allow for reliable distinction between image information and value changes due to additional reflection by the rain drops.

Figure 6:
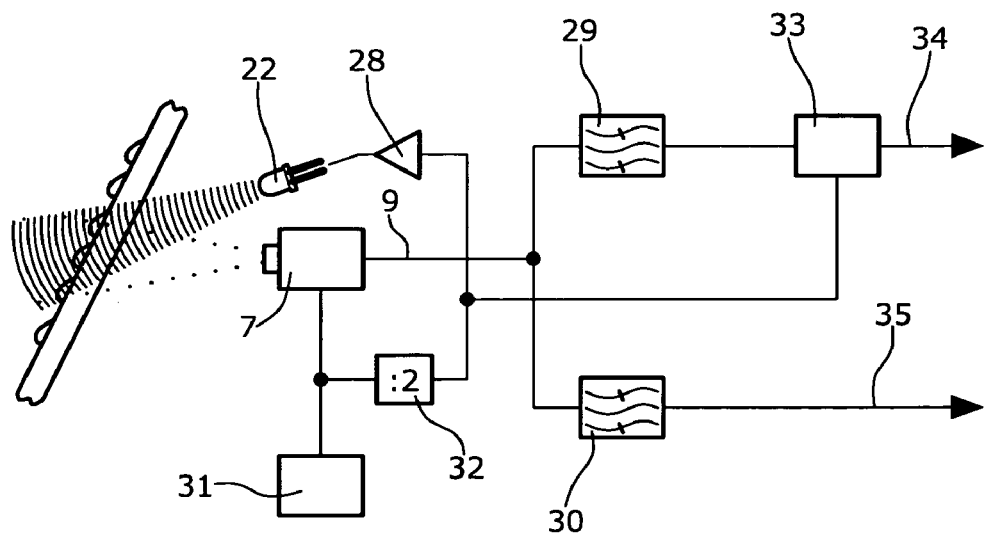
FIG. 6 shows a first embodiment of a circuit of the rain sensor according to the invention.

The emitted IR signal (pulsing of the IR light source 22) is thus pulsed at a frequency which is, if possible, directly related to the pixel-, line- or image frequency (in the embodiment shown in FIG. 6 at half the pixel frequency). In this connection, the IR light source 22 is switched on at every second pixel.

Synchronization of the IR emitting phase with the pixel-, line- or image frequency is not absolutely necessary but considerably facilitates further signal evaluation.

In the embodiment (FIG. 6) the pixel clock 31 is reduced by divider 32 to half the pixel frequency and supplied to the driver stage 28 for the IR source 22. Other ratios between exposure frequency of the camera 7 and the clock rate of the IR light source 22 (e.g. 1:3, 1:4) are also possible.

This ensures that at every second pixel the IR source 22 is switched on.

If e.g. the interrogation time for one pixel is 50 ns, this results in a square signal at the IR source having a frequency of 10 MHz corresponding to 50 ns switch on time to 50 ns switch off time.

Figure 9:
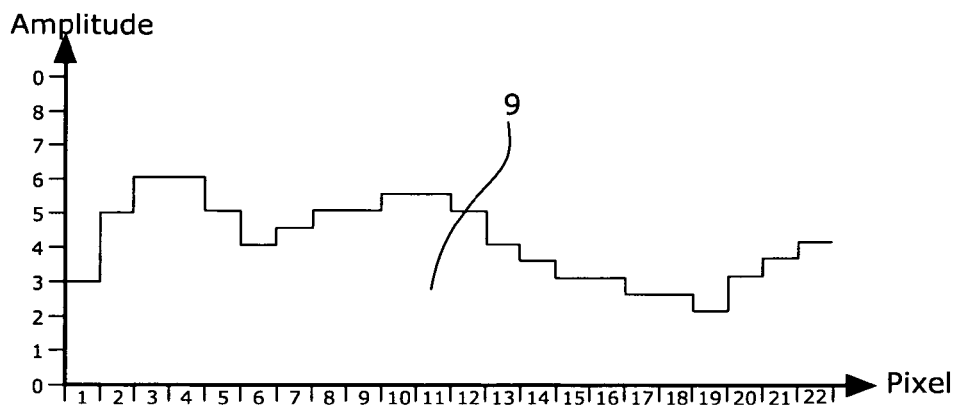
FIG. 9 shows an example of the signal pattern of successive pixels of a camera in the case of illumination exclusively by ambient light.

Of course, the pixel-relatedly scanned image and/or brightness information in a line will not take the flat course shown in FIG. 5. In dependence on the image content any value may occur at any time (e.g. as shown in FIG. 9).

In order to still separate the wetting information from the luminosity signal, the embodiment of FIG. 6 provides that the luminosity signal 9 supplied by the camera 7 is transmitted through a band pass or high pass filter 29 having a pass range that is analogue with the frequency of the IR light source.

This band pass or high pass filter 29 separates the low-frequency components of the image information. At the output of the filter 29, the signal information primarily are the signal portions of the IR light source 22 reflected by the rain drops, present as AC voltage information.

A synchronous demodulator 33 continues to suppress randomly occurring spectral portions in the image signal, e.g. by scanning a periodic light-dark surface with a frequency similar to that of the IR light source 22.

The wetting information 34 is present at the output of the synchronous demodulator 33 as a DC voltage signal.

The frequency of the IR source 22 also appears as a spectral line in the image signal information supplied by the camera 7 and can be excluded using suitable means such as a simple suppression filter 30.

Figure 7:
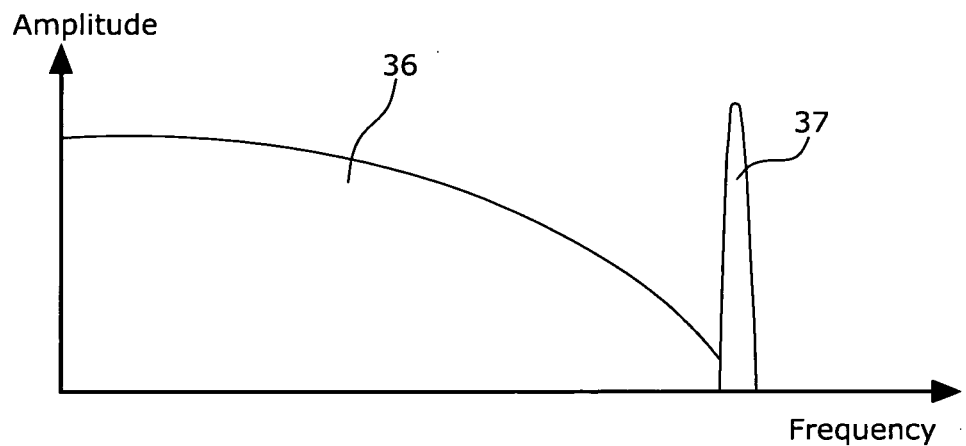
FIG. 7 shows a graphic representation of the normal background information of a pixel in comparison to the additional information supplied by clocked illumination.

FIG. 7 illustrates the statistic spectrum of the scanned image luminosity signal.

The spectral line 37 of the IR light source 22 is located at the upper end of the spectrum, i.e. in a region where the least energy portion of the image luminosity spectrum 36 is to be expected.

In the embodiment of FIG. 6, the "blurring" of the rain drop representation bears a positive effect in contrast with a "sharp" image. Whereas a sharply imaged and thus small point of reflection would for example comprise only one pixel and would therefore be filtered out by filter 29 like a signal step in the image information, a "blurred" point of reflection comprises a plurality of pixels and thus create a clear signal after transient oscillation of the filter 29.

With this arrangement, a rather accurate detection of drops is possible, but the separation of the high-frequency IR signal information from the image luminosity information might possibly not yield the required accuracy.

Figure 8:
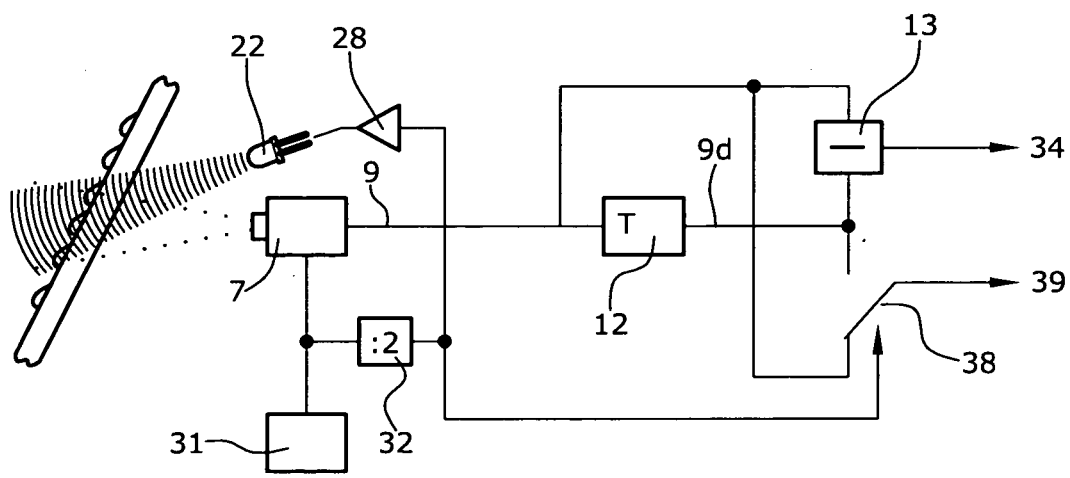
FIG. 8 shows a second embodiment of the circuit of the rain sensor.

FIG. 8 illustrates a circuit diagram for a nearly perfect separation of wetting and image luminosity signal.

Observing the image information line by line, it becomes clear that the signal path generally shows negligible changes from one line to the other.

Figure 10:
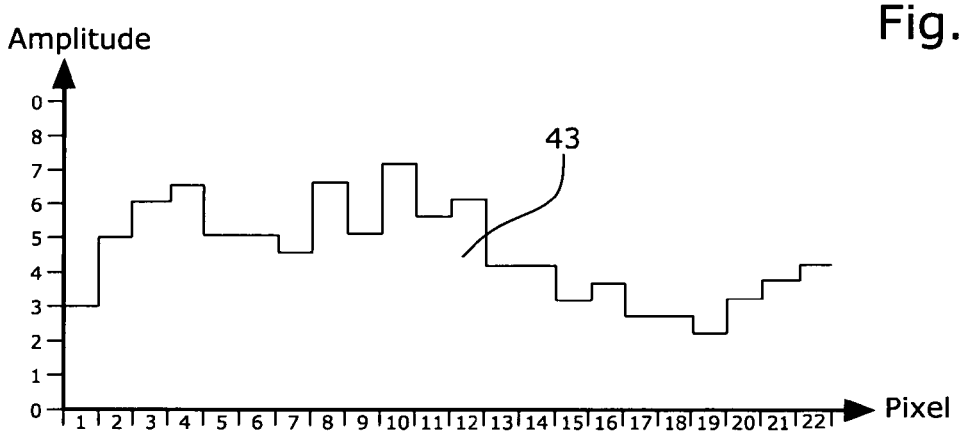
FIG. 10 shows the signal shown in FIG. 8 with additional clocked illumination for detecting a wetting condition.

Clocking the IR light source 22 within even line numbers, e.g. in even pixel numbers, and within uneven line numbers in uneven pixel numbers, a simple addition of the luminosity signal of one line and the inverted information of the previous line yields as a result a signal for the wetting of the screen that is nearly independent from the image information. This is illustrated in FIGS. 9 to 12. FIG. 9 illustrates a random image luminosity signal 9 over a period of 22 pixels. In the illustration of FIG. 10, the IR light source 22 was turned on in one line upon illumination of the even pixels 2, 4, 6, . . . , and an image signal 43 with a modulation corresponding to the wetting is obtained.

Figure 11:
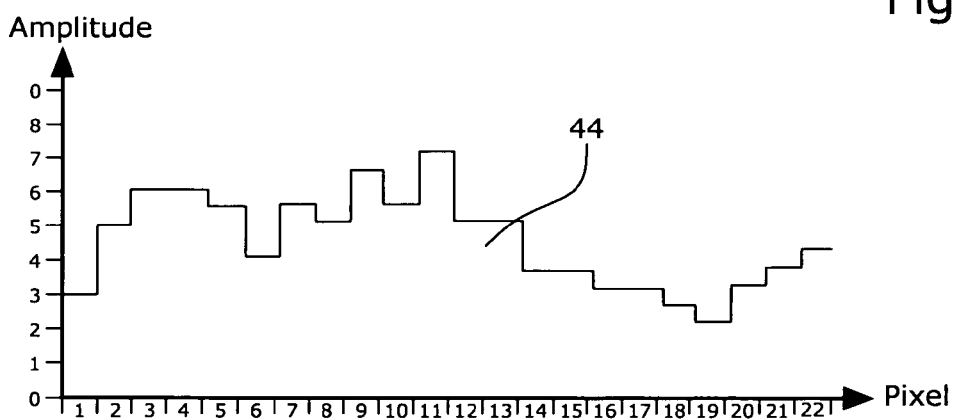
FIG. 11 shows a signal pattern similar to that shown in FIG. 10, however for an adjacent line and with the clocking of the additional light source offset by 180°.

One line later, the IR light source 22 was turned on upon illumination of the uneven pixels, i.e. the pixels 1, 3, 5, . . . , and an image signal 44 with a modulation shifted by 180° with respect to the first line is obtained (FIG. 11).

Figure 12:
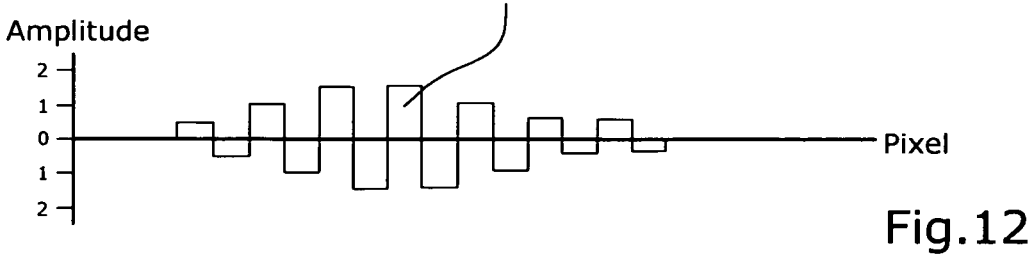
FIG. 12 shows the differential signal shown in FIGS. 10 and 11 for illustrating a wetting condition of the windscreen.

The difference between both image signals 43 and 44 (s. FIG. 12) now yields the pure wetting information 45. The same represent a "rain drop" in the area of the 9 and 10, which, however, seems to be distributed over a lot more pixels due to the blurredness of the image on the sensitive camera surface.

In the embodiment of FIG. 8, the luminosity signal 9 of the camera 7 is supplied to a delay circuit 121 with the delay time of one horizontal line. The differential signal 34 obtained from the luminosity signal delayed by one line and from the non-delayed luminosity signal corresponds to the wetting of the screen surface. Upon wetting, an alternate signal with half the pixel clock frequency is present at the output of the differentiating stage 13.

For an additional increase of the detection security, the synchronous detector 33 used in the embodiment of FIG. 6 may be added.

In the embodiment of FIG. 8, using a second circuit arrangement, the pure luminosity signal without the wetting information can be obtained. The switch 38 switches synchronously to the pixel clock rate between the direct luminosity signal 89 and the luminosity signal delayed by one line such that always only pixels are detected for which the IR light source has been turned off.

Thus, the pure luminosity signal 39 without the wetting information is present at the output of the switch 38.

Wetting Detection with Cameras Having a High Frame Rate

Of course, other switching sequences of the IR light source 22 can be used to detect the wetting of the screen surface. For example, the IR light source 22 may be turned on during the entire time of scanning a picture, while the IR light source 22 is turned off for the next image.

With a fast frame rate, the image signal amplitude or its value integrated over the scanning time will change only negligibly from one image to the next so that a significant signal pattern results upon wetting.

Figure 13:
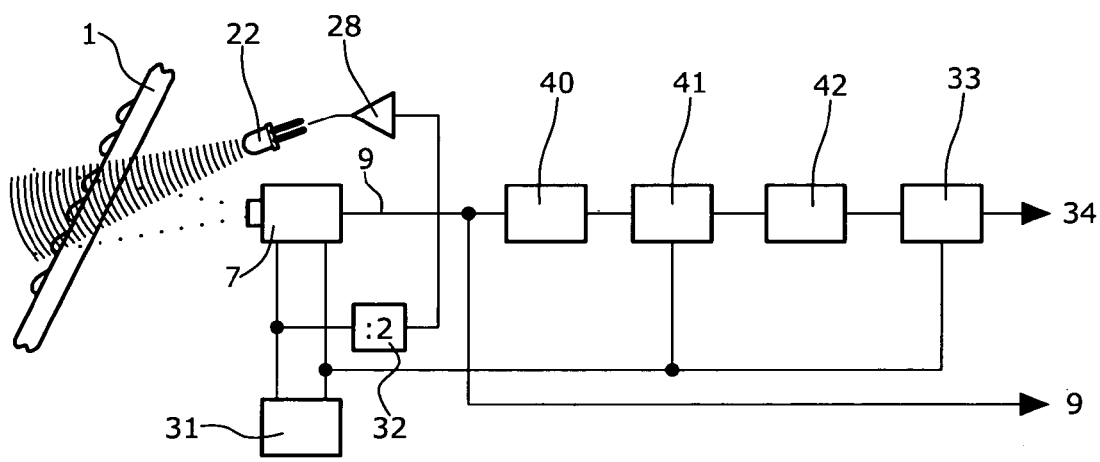
FIG. 13 shows another embodiment of a circuit of the rain sensor according to the invention.

FIG. 13 illustrates an embodiment of an arrangement for an image-sequential detection of the wetting of a screen surface 1.

The camera is supplied with the pixel and frame rate by the clock generator 31. Without wetting, the output signal 9 of the camera 7 will be almost the same from one image to the next, while, with wetting, a significant IR source synchronous signal pattern will again appear.

In the integrator 40, the total average value of the luminosity signal of a respective image is obtained. At the end of each image, the value memory 41 receives the total average value of the luminosity amplitude thereof.

Thus, when the screen surface is wetted, a frame-rate synchronous AC voltage is present at the output of the value memory 41.

The filter 42 is tuned to the frame rate frequency and, upon wetting, supplies a corresponding output signal from its output, which, after a synchronous demodulation in the synchronous demodulator 33 and a corresponding evaluation, may be used to control the windscreen wiper.

To obtain an image signal free of wetting signal components, of course every second image can be used for which the IR light source 22 had not been turned off.

The overall luminosity of a camera image of a camera with a high frame rate changes insignificantly from one image to the next, or uniformly, e.g. when driving into a tunnel. Here, no output signal is generated at the output of the filter 42. Only when the screen surface is wetted and an image-synchronous change in the amplitude is caused thereby, will a corresponding output signal be generated.

In principle, any optional switching sequence of the IR light source 22 can be used, as long as a differentiation between periods illuminated by the IR light source 22 and periods not illuminated by the IR light source is possible.

Coupling the IR Source From the Camera

Coupling the light source is most simply effected by light irradiated approximately in the line of sight of the camera 7.

Since a part of that light can be scattered in all direction by a wetting, a part of the reflected light could possibly also hit the driver or other passengers.

Therefore, the irradiated light should have a wavelength that is not visible to the human eye. This is a range from 700 nm, e.g. IR at 880 nm (see FIG. 3).

Given a mechanical shielding of the diffusely reflected light radiation from rain drops on the windscreen surface towards the driver/passenger, of course, any wavelength can be used.

Figure 14:
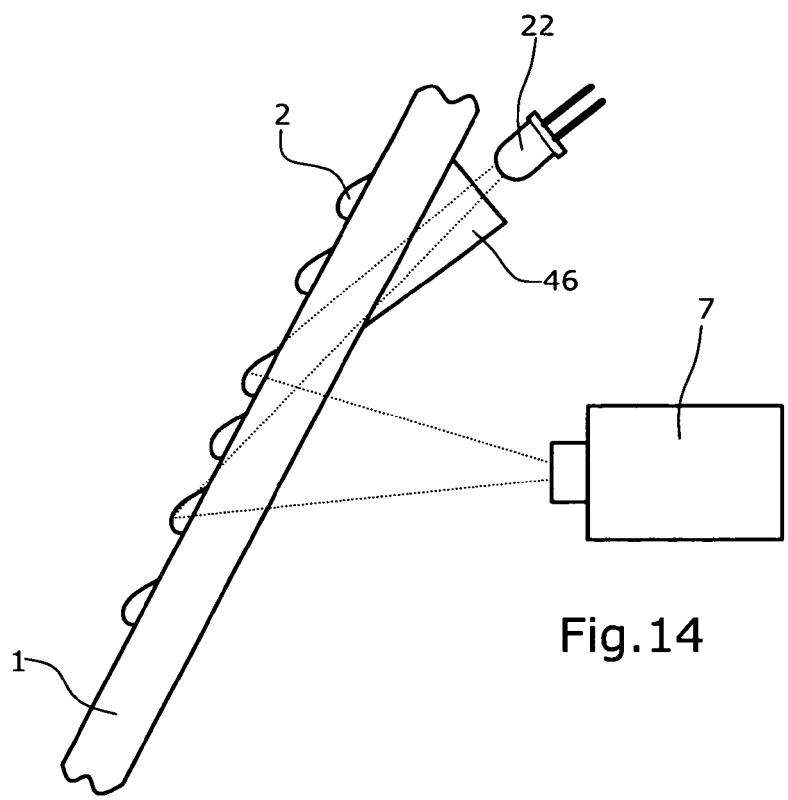
FIG. 14 shows an embodiment of the process for coupling clocked light via a prism into the windscreen.

Another method of coupling is obtained by a direct coupling of the light into the screen 1, e.g. when using a prism 46 as illustrated in the arrangement of FIG. 14. Here, the light only has to be coupled or injected into the screen, but not out from the same. Coupling the light out to the camera 7 is then effected by the diffraction at the drop-shaped wetting (as schematically illustrated in FIG. 4).

Figure 15:
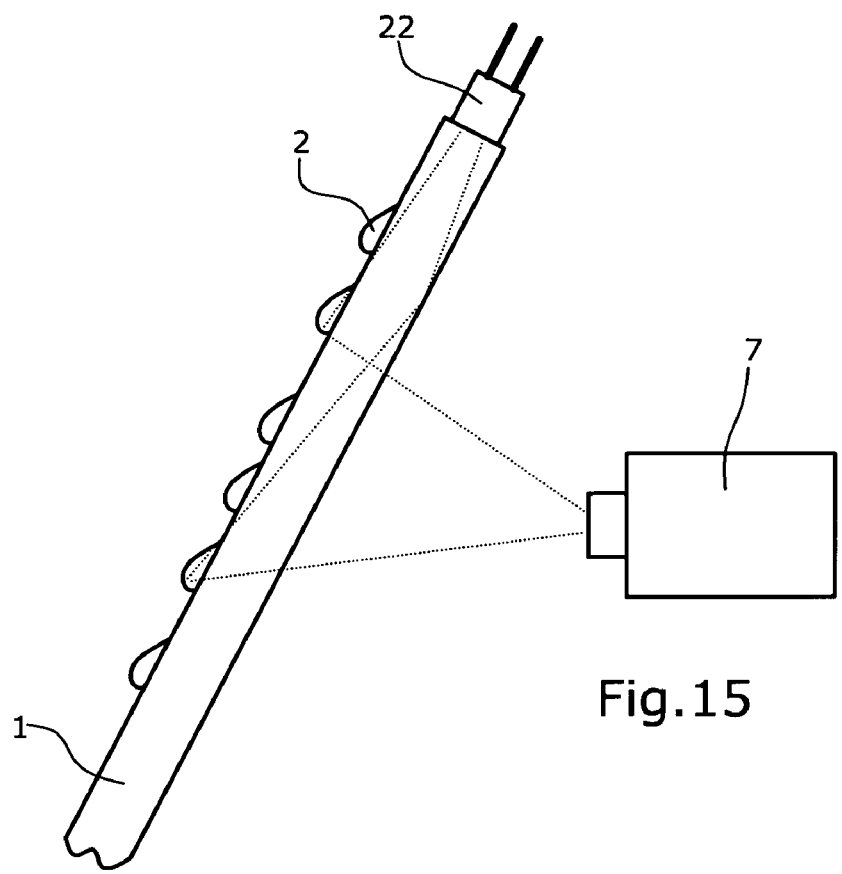
FIG. 15 shows an alternative process of coupling light of the clocked light source directly from the side via the edge of the windscreen into the windscreen.

FIG. 15 illustrates a lateral coupling of the light source 22 into the vehicle screen. Due to total reflection within the screen 1, the light stays entirely in the screen as long as no wetting allows for a transition of the light into a drop and thus causes a change of the angle of total reflection. In this case, a part of the light is deflected in all directions, i.e. also to the camera.

The wetting detection presented up to now mainly reacts to external surface wetting, it also being possible to detect internal wetting, i.e. by condensing breath. This is less true for an irradiation in parallel to the line of sight of the camera, but clearly effective for a lateral coupling or injection according to FIG. 14 or FIG. 15.

Detection of Internal Deposit/Fogging

It is often desired to be able to detect internal deposit/fogging independent from rain drops on the outer surface of the screen.

Through a corresponding arrangement of two light sources, it may be determined whether the wetting is an external wetting, e.g. rain drops, or an internal fogging, e.g. condensing breath. Based upon this determination, the blower or the windscreen wiper, for example, may be controlled separately.

Figure 16:
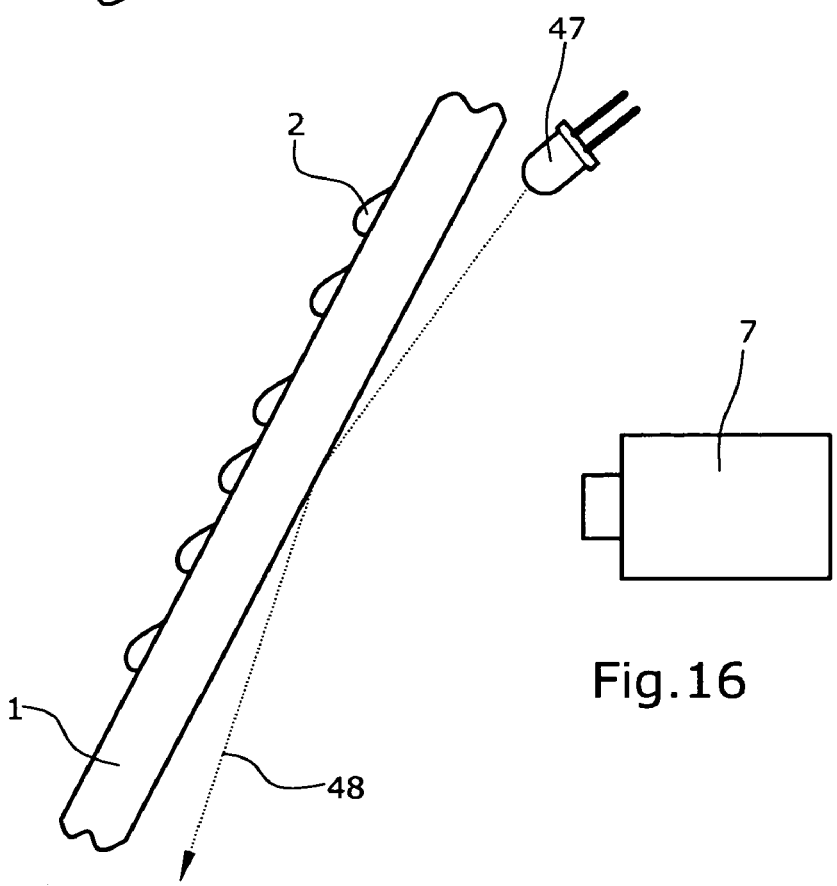
FIG. 16 shows an example of an arrangement of another light source for detecting an internal fogging condition.
Figure 17:
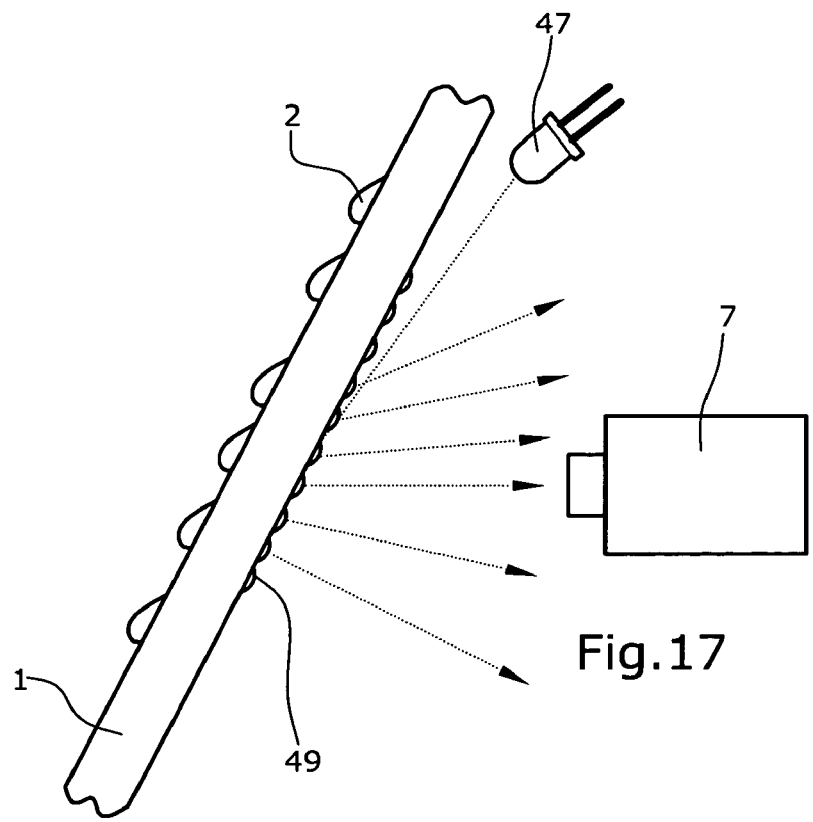
FIG. 17 shows a schematic representation of the functionality of illuminating the inside of the windscreen for detecting internal fogging.

To detect the interior fogging, a second light source 47 is arranged such that its light directed to the inner surface of the screen does not enter the screen when the screen is not wetted (dewy), but is possibly totally reflected (see FIG. 16).

When external wetting occurs, the light beam of the second light source 47 is not influenced. Only upon internal wetting 49 is the light beam of the light source 47 scattered diffusely so that part of the light also reaches the camera 7.

The light source 47 can preferably be driven with an own clock frequency or alternately with the IR light source 22 to differentiate between an internal fogging and an external wetting.

It should be observed that an internal fogging also has effects on the detection of an external wetting, if both light sources are located in the interior of the vehicle.

Subtracting the value generated by the detection in the interior from the value of the external rain drop detection, which also includes the value of the interior detection, the actual value for the exterior wetting of the screen is obtained.

Figure 18:
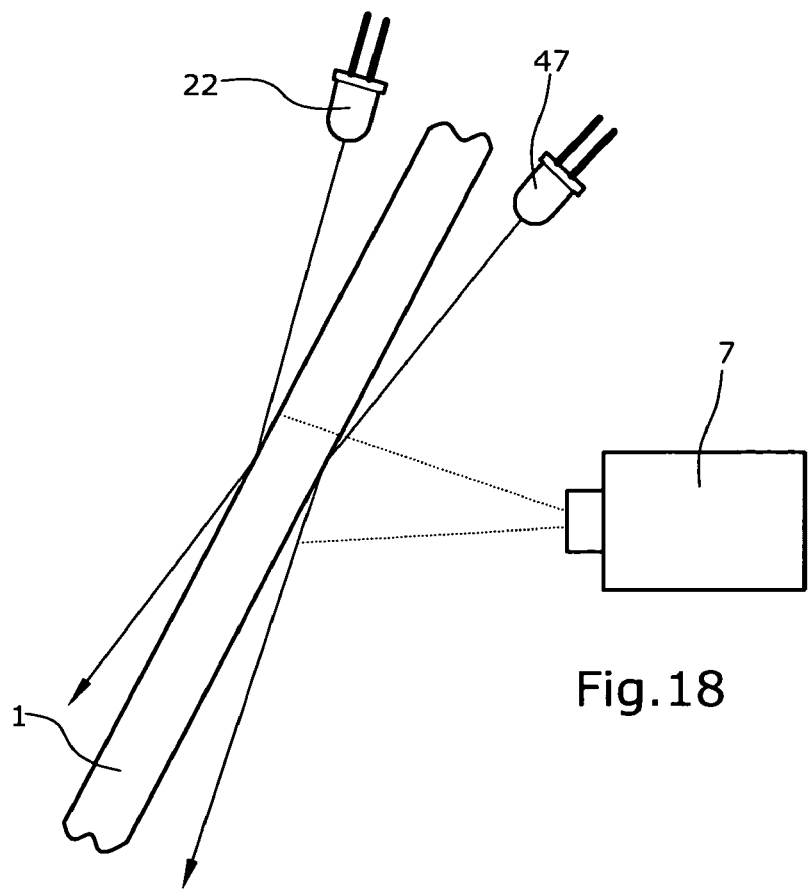
FIG. 18 a last embodiment for illustrating the possible arrangement of two light sources at both sides of a windscreen for the purpose of separate detection of and outside and an inside wetting condition.

If it is possible to arrange a light source outside the vehicle screen (e.g. in the frame of the screens or a screen shoulder of the vehicle body, the value of the inner fogging and the value of the external wetting can be obtained entirely separated from each other (see FIG. 18).

List of reference numerals

| | |
|---|---|
| 1 | front screen |
| 2 | wetting, rain drops |
| 3 | housing |
| 4 | transmitting element |
| 5 | receiving element |
| 6 | light path |
| 7 | camera |
| 8 | objective |
| 9 | image signal, 9d delayed image signal |
| 10 | line of sight of camera |
| 11 | visual angle of camera |
| 12 | lag element |
| 13 | subtraction stage |
| 14 | differentiated image signal |
| 15 | window comparator |
| 16 | digital wetting signal |
| 17 | image signal "road" |
| 18 | differentiation stage |

-continued

| List of reference numerals | |
|---|---|
| 19 | drop detection |
| 20 | background signal |
| 21 | threshold values |
| 22 | light source, LED |
| 23 | emitted light beam |
| 24 | light beam reflected by drop |
| 25 | image signal without light source turned on |
| 26 | difference with light source turned on |
| 27 | image signal with light source turned on |
| 28 | driver stage |
| 29 | band pass filter |
| 30 | suppression filter |
| 31 | clock generator |
| 32 | divider |
| 33 | synchronous demodulator |
| 34 | wetting information |
| 35 | filtered image information |
| 36 | spectrum of image signal |
| 37 | spectrum of wetting signal |

The invention claimed is:

1. Device for detecting the wetting and/or soiling of a windscreen surface, in particular in a vehicle, comprising
 a camera with a sensor having a plurality of light-sensitive pixels arranged as an array and adapted to be illuminated according to an illumination cycle, and having a focusing optic for a camera focus set to almost infinite, and
 a light source for illuminating a detection portion of the screen surface detectable by the camera,
 wherein
 the light source is switched on and off according to a predeterminable ON/OFF cycle,
 the ON/OFF cycle is synchronized to the illumination cycle of the camera sensor, and
 the wetting/soiling of the screen surface is detected by comparing the image information from the sensor of the camera when the light source is turned on and when the light source is turned off.

2. Device of claim 1, wherein one pixel, one pixel line or all pixels of the camera sensor are illuminated per illumination cycle and wherein the ON/OFF cycle is synchronized with a pixel-scanning frequency, a line-scanning frequency or an image-scanning frequency of the camera sensor.

3. Device of claim 1, wherein the light source emits electromagnetic radiation in a wavelength range no visible to the human eye.

4. Device of claim 1, wherein the light source is sinusoidally controllable.

5. Device of claim 1, wherein a wetting of the screen surface is detectable by filtering out and evaluating the ON/OFF cycle frequency with which the light source is driven, using a synchronous demodulator and/or a filter arrangement.

6. Device of claim 1, wherein an image luminosity signal is obtained from the output signal of the camera sensor by filtering the ON/OFF cycle frequency from this image luminosity signal.

7. Device of claim 1, wherein the ON/OFF cycle is phase-shifted by 180° from one line to the next.

8. Device of claim 1, wherein, for obtaining a signal indicating wetting from the signal of the camera sensor, the signals of the pixels of two successive lines of the sensor are subtracted.

9. Device of claim 8, wherein the wetting signal is subjected to filtering and/or synchronous demodulation.

10. Device of claim 1, wherein, for obtaining an image signal with superimposed wetting information, the signals of two successive lines of the sensor are added.

11. Device of claim 1, wherein, for obtaining an image signal without wetting information, the light source is switched synchronously to the switching clock between two successive lines of the camera sensor.

12. Device of claim 1, wherein, within a, period of the output signal of the camera sensor, an, averaging without activation of the light source is effected, wherein, for another period of the output signal of the camera sensor, an averaging with activation of the light source is effected, and wherein both average values are compared to obtain a wetting signal or a wetting value.

13. Device of claim 12, characterized by a mutual comparison between the average value for the periods without light source activation and the average value for the periods with light source activation by means of filtering the differential value and/or synchronous demodulation for the purpose of detecting the wetting.

14. Device of claim 1, wherein the light from the light source is coupled directly into the screen and, given a wetting, a reflection towards the camera occurs on the side opposite the coupling.

15. Device of claim 14, wherein the coupling of the light is effected laterally into the screen or with a prism into the surface of the screen.

16. Device of claim 1, wherein the electromagnetic radiation of the light source impinges with total reflection on that surface of the screen on which a wetting is to be detected.

17. Device of claim 1, wherein the light source is a first light source the device further comprising a second light source whose light impinges under total reflection on the inside of the screen to detect wetting thereon.

18. Device of claim 17, wherein both light sources are driven separately for a separate detection of wetting on the outside of the screen and fogging on the inside of the screen.

19. Device of claim 17, wherein both light sources are driven simultaneously using different clock frequencies.

20. Device of claim 17, characterized by the subtraction of a value of the inner reflection by the second light source from the value of the inner and outer reflection by the first light source in order to obtain a value for the external wetting.

21. Device of claim 17, wherein the light of the first light source impinges under total reflection on the inner side of the screen for the detection of interior fogging and the light from the second light source impinges under total reflection on the outer side of the screen for the detection of an external wetting.

22. Device of claim 1, wherein the focusing optics of the camera are adjusted between almost infinite and the screen surface.

23. Device of claim 1, characterized by a detector for the detection of contrast steps in the signal from the sensor for detecting the wetting/soiling on the screen surface.

* * * * *